(12) United States Patent
Wu et al.

(10) Patent No.: US 9,764,655 B2
(45) Date of Patent: Sep. 19, 2017

(54) HYBRID POWER SUPPLY AND ELECTRIC VEHICLE USING THE SAME

(71) Applicant: Microvast Power Systems Co., LTD., Huzhou, Zhejiang Province (CN)

(72) Inventors: Yang Wu, Huzhou (CN); Xuechun Liu, Huzhou (CN)

(73) Assignee: MICROVAST POWER SYSTEMS CO., LTD., Huzhou, Zhejiang Province (CN)

( * ) Notice: Subject to any disclaimer, the term of this patent is extended or adjusted under 35 U.S.C. 154(b) by 188 days.

(21) Appl. No.: 14/815,955

(22) Filed: Jul. 31, 2015

(65) Prior Publication Data
US 2016/0023571 A1   Jan. 28, 2016

(30) Foreign Application Priority Data
Jul. 28, 2014   (CN) ................ 2014 2 0418513 U

(51) Int. Cl.
*H02J 7/00* (2006.01)
*B60L 11/18* (2006.01)
*B60L 11/12* (2006.01)

(52) U.S. Cl.
CPC ....... B60L 11/1864 (2013.01); B60L 11/1811 (2013.01); B60L 11/1868 (2013.01); *B60L 11/12* (2013.01); *Y02T 10/7011* (2013.01); *Y02T 10/7061* (2013.01); *Y02T 10/7066* (2013.01); *Y02T 10/7072* (2013.01); *Y02T 10/7077* (2013.01); *Y02T 90/127* (2013.01); *Y02T 90/14* (2013.01)

(58) Field of Classification Search
CPC .............. B60L 11/1811; B60L 11/1864; B60L 11/1868; Y02T 10/7011; Y02T 10/7061
USPC ................ 320/103, 104, 132, 140
See application file for complete search history.

(56) References Cited

U.S. PATENT DOCUMENTS

| | | | |
|---|---|---|---|
| 2007/0166574 A1 | 7/2007 | Nakashima et al. | |
| 2009/0167217 A1 | 7/2009 | Soma et al. | |
| 2011/0025124 A1* | 2/2011 | Brabec | B60L 11/1861 307/9.1 |
| 2013/0257375 A1* | 10/2013 | Ang | H02J 7/022 320/109 |

FOREIGN PATENT DOCUMENTS

| | | |
|---|---|---|
| CN | 101005148 A | 7/2007 |
| CN | 101489824 B | 11/2011 |

* cited by examiner

*Primary Examiner* — Edward Tso
*Assistant Examiner* — Aaron Piggush
(74) *Attorney, Agent, or Firm* — Cheng-Ju Chiang

(57) ABSTRACT

A hybrid power supply includes a first battery array, a second battery array, and a controller. The first battery array includes a plurality of first battery packs. The second battery array includes a plurality of second battery packs. The controller controls charging and discharging of the first battery array and the second battery array. The second battery array is connected in parallel with the first battery array by at least a bidirectional converter. The first battery array and the second battery array are connected to a power bus for outputting power. The first battery array has a high-rate charging/discharging performance higher than the second battery array. The second battery array has a capacity greater than the first battery array.

20 Claims, 3 Drawing Sheets

HYBRID POWER SUPPLY AND ELECTRIC VEHICLE USING THE SAME

CROSS REFERENCE TO RELATED APPLICATION

The present application is based on and claims priority of Chinese Patent Application No. 201420418513.X, filed on Jul. 28, 2014. The entire disclosure of the above-identified application, including the specification, drawings and claims are incorporated herein by reference in its entirety.

FIELD OF THE INVENTION

The present invention relates to a power supply, and more particularly to a hybrid power supply suitable for an electric vehicle.

BACKGROUND OF THE INVENTION

Lithium-ion battery is known as a high energy density battery with high output voltage in average and high output power. It has low self-discharge, no memory effect, wide working temperature range (from −20° C. to 60° C.), excellent cycling performance, high charging and discharging efficiency, and long life. The lithium-ion battery is a green battery which does not pollute the environment. Increasingly, the lithium-ion battery is being used in the electric vehicle, reducing cost for consumers and representing a development trend in future.

However, compared to traditional applications of the lithium-ion battery in cell phones, laptop computers and other small appliances, the electric vehicle requires the lithium-ion battery with a higher requirement. The electric vehicle not only requires the power supply to have a higher stability and security, but also requires the power supply to have a longer continuous duration. A fluctuation of load on the electric vehicle is also very large. Therefore, the power supply for the electric vehicle requires a higher charging and discharging performance, as well as a higher capacity.

Existing battery design fails to meet both requirements of high capacity performance and high power performance at the same time. For example, the lithium-ion secondary battery, as a typical high capacity battery, is designed to increase its capacity so as to maximize the mileage for the electric vehicle. The battery packs of the lithium-ion secondary battery can be discharging for a long and continuous time under 0.2 C in applications with low-load. However, this type of battery cannot meet the driving requirement, especially the acceleration requirement for the electric vehicle. Therefore, the above-mentioned lithium-ion secondary battery with high capacity cannot fit in applications with high-load such as in the electric vehicle. In order to meet the acceleration requirement for the electric vehicle with high-load, super capacitors with high power are proposed to be set in a discharging circuit of the battery.

Chinese Issue No. CN101489824B, entitled "vehicle power control device", discloses a proposal of combining high capacity battery with capacitor, so as to meet the high-load power requirement during acceleration of a vehicle. In the power control device, a high capacity battery, a capacitor and a voltage booster are connected in sequence. The capacitor has the characteristic of a fast charging and discharging performance under a large current, and the power of the battery is boosted by the voltage booster to finally drive an electric motor of a vehicle. Due to the limited capacity of the super capacitor, the power control device can only be used under special situations to meet the high-load requirement within a short time. The battery fails to output high power continuously for several or dozens of minutes. Also, the battery neither improve a charge rate, nor extend a driving mileage.

Chinese Publication No. CN101005148A, entitled "hybrid power supply device", discloses a proposal of connecting a high-capacity battery in parallel with a high-power battery to obtain a hybrid power supply, wherein the high-capacity battery and the high-power battery have different discharging properties. The discharging capacity of each cell in the high-capacity battery under 0.2 C is higher than that of each cell in the high-power battery under 0.2 C. Furthermore, a ratio of the discharging capacity of each cell in the high-power battery under 5 C to the discharging capacity of each cell in the high-power battery under 0.2 C, is higher than a ratio of the discharging capacity of each cell in the high-capacity battery under 5 C to the discharging capacity of each cell in the high-capacity battery under 0.2 C. Although the hybrid power supply can extend the mileage for a vehicle to a certain extent, the requirements of high-load and fast energy recovery cannot be satisfied, due to the discharging capacity of the high-power battery being 5 C, which is weaker than the discharging capacity of a super capacitor. The high-power battery is only used as a supplement for the high-capacity battery.

SUMMARY OF THE INVENTION

The purpose of the present invention is to overcome the above mentioned drawbacks by providing a hybrid power supply comprising a plurality of battery packs. The hybrid power supply comprises a first battery array, a second battery array and a controller. The first battery array comprises a plurality of first battery packs. The second battery array comprises a plurality of second battery packs. The controller controls charging and discharging of the first battery array and the second battery array. The second battery array is connected in parallel with the first battery array by bidirectional converter, and the first battery array and the second battery array are connected to a power bus for outputting power. The first battery array has a high-rate charging/discharging performance higher than the second battery array, a maximal continuous discharging rate of the first battery array is in the range from 15 C to 35 C, and a maximal continuous charging rate of the first battery array is in the range from 4 C to 30 C. The second battery array has a capacity greater than the first battery array, and a ratio of the capacity of the first battery array to the second battery array is in the range from 1:2 to 1:10.

The controller controls charging and discharging of the plurality of the first battery packs in the first battery array and the plurality of the second battery packs in the second battery array. Charging is optimized and allocated between the first battery array and the second battery array according to the charging power, to ensure a maximal amount of charge to be obtained within a short period. The second battery array is connected to the first battery array in parallel by bidirectional converter, and then they are connected to a power bus for outputting power, so as to avoid a current circulation caused by the voltage difference between the first battery array and the second battery array. The first battery array has a higher rated voltage than the second battery array, to improve the charging and discharging efficiency of the bidirectional converter. The second battery array is provided with a capacity greater than the first battery array, to increase the mileage for the electric vehicle. The first battery array has a high-rate charging/discharging performance higher than the second battery array, so as to meet the power requirement, the energy-recovery requirement, the fast charging and discharging requirement of the electric vehicle, and accordingly to extend the mileage of the electric vehicle.

Considering actual driving requirements from various electric vehicles, the ratio of the capacity between the first battery array and the capacity of the second battery array is preferably in the range from 1:2 to 1:10. The capacity of the first battery array can be increased to meet the requirements of frequent high-load speed-ups or brakes, and fast charging. The capacity of the second battery array can be increased to meet the requirements of stable driving conditions, and the mileage at the same time. Preferably, a ratio of the capacity between the first battery array and the second battery array is in the range from 1:2 to 1:10.

The first battery array has a charging and discharging performance under a continuous large current. A continuous charging rate of the first battery array can reach 20 C and a continuous discharging rate of the first battery array can reach 30 C, and in this condition, temperature rising of the battery is under control.

Preferably, the second battery array is controlled by the controller to be used to charge the first battery array in one-way direction when the first battery array is needed to be charged.

Preferably, a ratio of the capacity between the first battery array and the second battery array is in the range between 1:2 and 1:8, and more preferably, a ratio of the capacity between the first battery array and the second battery array is 1:8.

Preferably, a capacity of the second battery array is 2 to 8 times of that of the first battery array, which is a preferred balance point between the capacity and the fast charging-discharging performance for the whole power supply. In one embodiment, the capacity of the second battery array is 8 times of that of the first battery array, which is the most preferred balance point among the capacity, the fast charging-discharging performance, and the cost.

Preferably, a maximal continuous discharging rate of the first battery array is in the range from 20 C to 35 C.

For lithium-ion secondary batteries in prior art, the continuous charging and discharging rate is under 1 C. However, the discharging performance cannot meet the requirement of instant high-load for the electric vehicle and the requirement of being charged within a short time. In the present invention, however, the maximal continuous discharging rate of the first battery array can be 20 C to 35 C.

More preferably, the maximal continuous discharging rate of the first battery array is 30 C.

To balance the discharging performance and the discharging temperature, the maximal continuous discharging rate of the first battery array is set at 30 C, for fast discharging.

Preferably, the maximal continuous charging rate of the first battery array is in the range from 4 C to 20 C.

Preferably, the controller controls the second battery array to charge the first battery array by the bidirectional converter when the first battery array is required to be charged.

Usually, the capacity of the first battery array is less than the capacity of the second battery array, and the first battery array is faster than the second battery array in charging and discharging. If the first battery array is under the state of power shortage, the whole power supply will lose its ability to carry high-load. This issue can be effectively solved by controlling the second battery array to charge the first battery array by the bidirectional converter when the first battery array is needed to be charged. The bidirectional converter is a bidirectional transformer converter, by which the voltage of the second battery array can be changed, the voltage of the second battery array can be adjusted to be identical to the voltage the first battery array, and the first battery array is prohibited from being used to charge the second battery array. That is, the second battery array is used to charge the first battery array in one-way direction, but the first battery array cannot be used to charge the second battery array. As mentioned above, the first battery array can be charged by the second battery array when needed, to maintain the power supply to carry high-load.

Preferably, the bidirectional converter is a bidirectional transformer converter.

In the present invention, the hybrid power supply has the performance of fast charging, which ensures fast charging within a short period to get high energy storage. Even the hybrid power supply is charged only in a short period, it can maintain the electric vehicle to drive for a long period of time, which is better than the super capacitor. Like the super capacitor, the hybrid power supply has the high power fast discharging performance, to thereby meet the requirement of instant high-load for the electric vehicle. Thus, the hybrid power supply is superior to a power supply with a single battery. The hybrid power supply has higher energy density, and after being charged, the hybrid power supply can attain a lot of power to enable the electric vehicle for driving a long period of time.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Embodiment 1

Figure 1A:
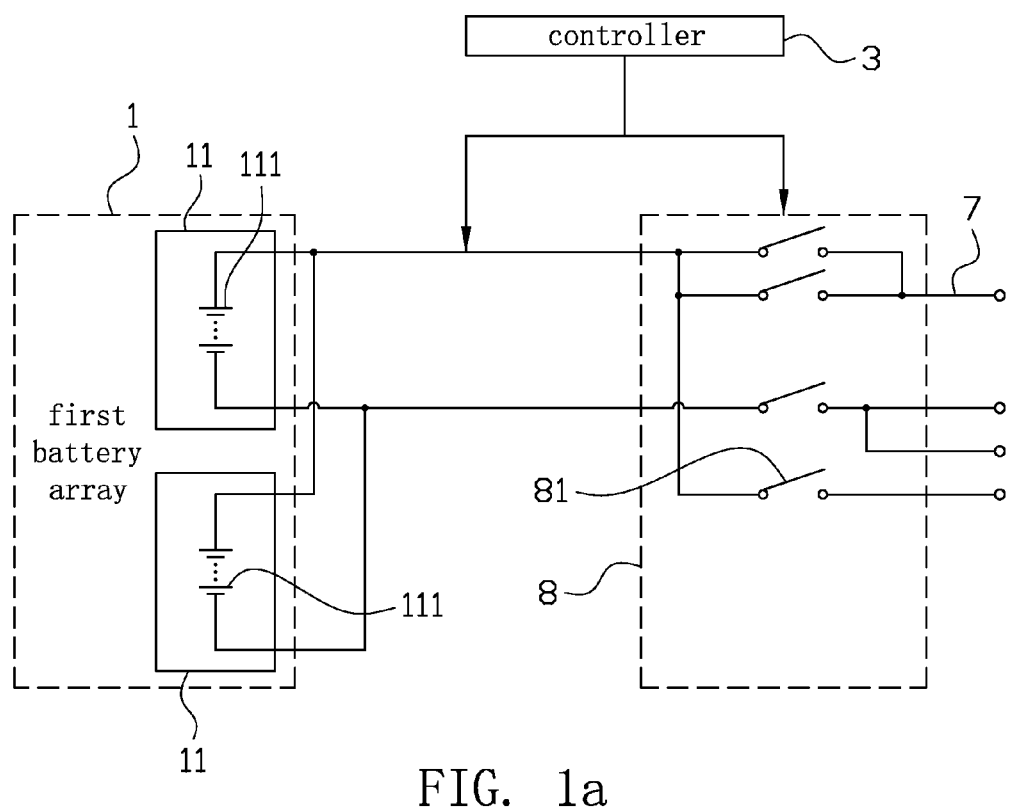
FIG. 1a and FIG. 1b are schematic views of a hybrid power supply according to an embodiment of the present invention.
Figure 1B:
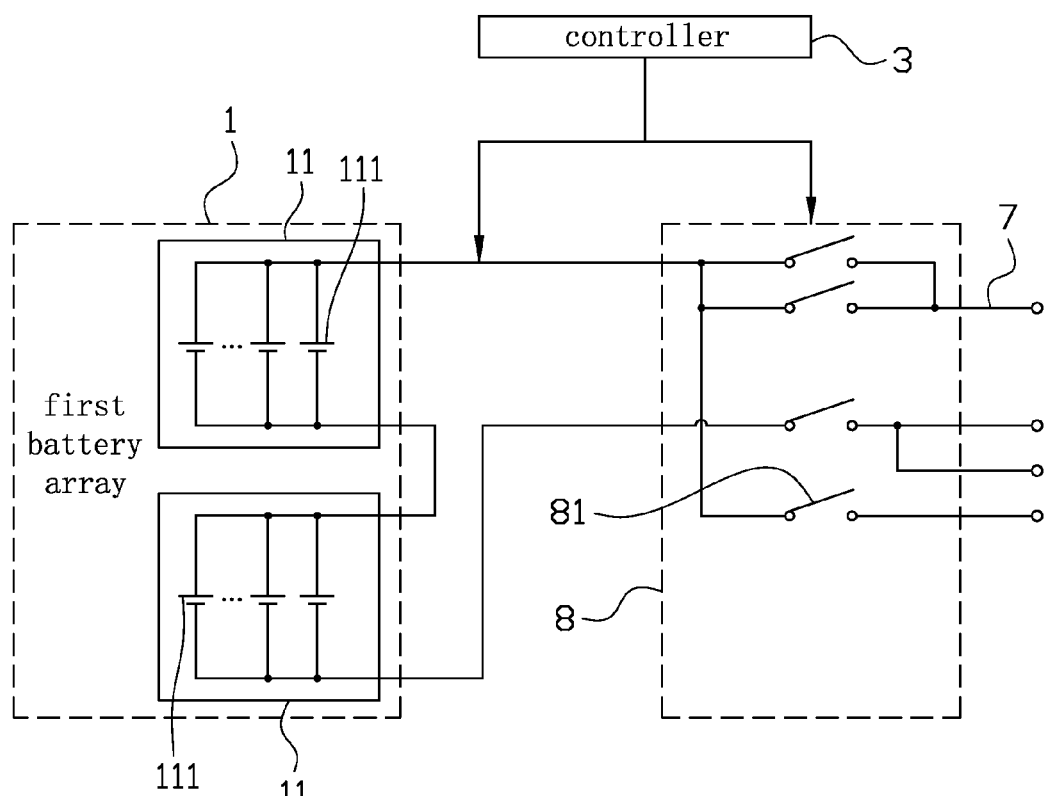

As shown in FIG. 1a and FIG. 1b, a hybrid power supply of the present embodiment includes a first battery array 1 and a controller 3. The first battery array 1 includes a plurality of first battery packs 11. Each of the first battery packs 11 includes a plurality of first battery cells 111. Referring to FIG. 1a, as an example, these first battery packs 11 in the first battery array 1 are connected together in parallel, and these first battery cells 111 in each first battery pack 11 are connected together in series. Referring to FIG. 1b, as another example, these first battery packs 11 in the first battery array 1 are connected together in series, and these first battery cells 111 in each first battery pack 11 are connected together in parallel. The first battery array 1 finally outputs power through a power bus 7. In the power bus 7, a switch module 8 is mounted thereon. The switch module 8 includes a plurality of switches 81 which can be switched on or off to control the output of the first battery array 1. The controller 3 controls the first battery array 1 for charging and discharging. A maximal continuous discharging rate of the first battery array 1 is 30 C, and a maximal continuous charging rate of the first battery array 1 is 4 C.

Embodiment 2

Figure 2:
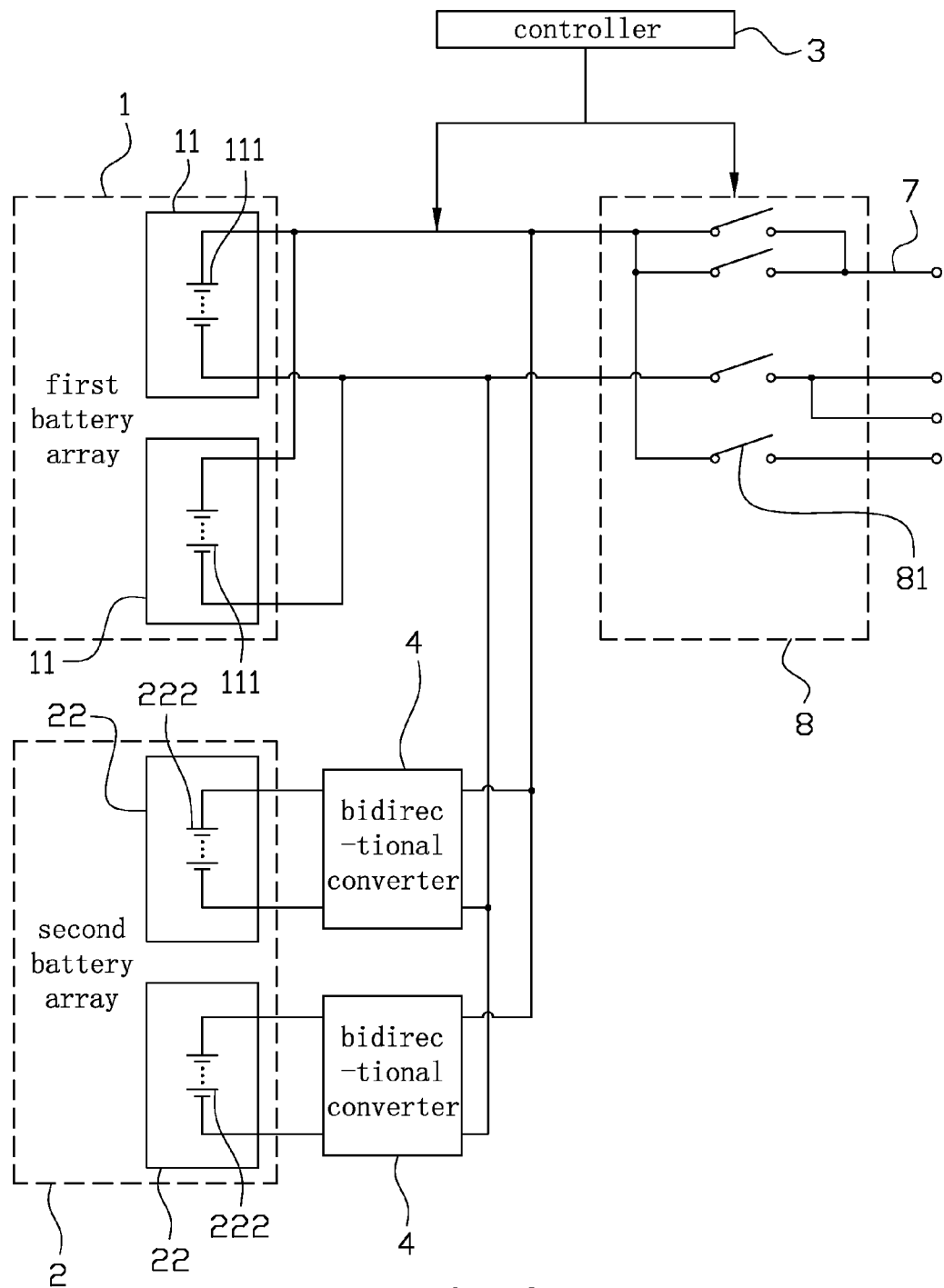
FIG. 2 is a schematic view of a hybrid power supply according to another embodiment of the present invention.

As shown in FIG. 2, a hybrid power supply of the present embodiment includes a first battery array 1, a second battery array 2 and a controller 3. The first battery array 1 includes a plurality of first battery packs 11, and the second battery array 2 includes a plurality of second battery packs 22. These first battery packs 11 in the first battery array 1 are connected together in parallel, for example. Each of the first battery packs 11 includes a plurality of first battery cells 111. These first battery cells 111 in each first battery pack 11 are connected together in series, for example. These second battery packs 22 in the second battery array 2 are connected together in parallel, for example. Each of the second battery packs 22 includes a plurality of second battery cells 222. These second battery cells 222 in each second battery pack 22 are connected together in series, for example. The first battery array 1 and the second battery array 2 finally output power through a power bus 7. In the power bus 7, a switch module 8 is mounted thereon. The switch module 8 includes a plurality of switches 81 which can be switched on or off to control the output of the first battery array 1 and the second battery array 2. The controller 3 controls the first battery array 1 and the second battery array 2 for charging and discharging. The second battery array 2 is connected in parallel with the first battery array 1 by at least a bidirectional converter 4, for example, each second battery pack 22 is connected to the first battery array 1 via a bidirectional converter 4. Each second battery pack 22 together with the bidirectional converter 4 connected thereto is connected to the first battery array 1 in parallel. The first battery array 1 and the second battery array 2 are finally connected to the power bus 7 for outputting power of the hybrid power supply. The first battery array 1 has a rated voltage higher than the second battery array 2. The first battery array 1 has a high-rate charging/discharging performance higher than the second battery array 2, wherein a maximal continuous discharging rate of the first battery array 1 is 30 C, and a maximal continuous charging rate of the first battery array 1 is 4 C. The second battery array 2 has a capacity greater than the first battery array 1, wherein a ratio of the capacity between the first battery array 1 and the second battery array 2 is 1:2. In the hybrid power supply of this embodiment, a quantity of the first battery packs 11 to the second battery packs 22 is 1:1.

In this embodiment, the bidirectional converter 4 is a bidirectional transformer converter. The controller 3 controls the second battery array 2 to charge the first battery array 1 by the bidirectional converter 4 in one-way direction. That is, when the first battery array 1 is needed to be charged, the second battery array 2 is controlled by the controller 3 and used to charge the first battery array 1. However, the first battery array 1 is prohibited from being used to charge the second battery array 2.

Embodiment 3

As shown in FIG. 2, a hybrid power supply of the present embodiment includes a first battery array 1, a second battery array 2 and a controller 3. The first battery array 1 includes a plurality of first battery packs 11, and the second battery array 2 includes a plurality of second battery packs 22. These first battery packs 11 in the first battery array 1 are connected together in parallel, for example. Each of the first battery packs 11 includes a plurality of first battery cells 111. These first battery cells 111 in each first battery pack 11 are connected together in series, for example. These second battery packs 22 in the second battery array 2 are connected together in parallel, for example. Each of the second battery packs 22 includes a plurality of second battery cells 222. These second battery cells 222 in each second battery pack 22 are connected together in series, for example. The first battery array 1 and the second battery array 2 finally output power through a power bus 7. In the power bus 7, a switch module 8 is mounted thereon. The switch module 8 includes a plurality of switches 81 which can be switched on or off to control the output of the first battery array 1 and the second battery array 2. The controller 3 controls the first battery array 1 and the second battery array 2 for charging and discharging. The second battery array 2 is connected in parallel with the first battery array 1 by at least a bidirectional converter 4, for example, each second battery pack 22 is connected to the first battery array 1 via a bidirectional converter 4. Each second battery pack 22 together with the bidirectional converter 4 connected thereto is connected to the first battery array 1 in parallel. The first battery array 1 and the second battery array 2 are finally connected to the power bus 7 for outputting power of the hybrid power supply. The first battery array 1 has a rated voltage higher than the second battery array 2. The first battery array 1 has a high-rate charging/discharging performance higher than the second battery array 2, wherein a maximal continuous discharging rate of the first battery array 1 is 30 C, and a maximal continuous charging rate of the first battery array 1 is 4 C. The second battery array 2 has a capacity greater than the first battery array 1, wherein a ratio of the capacity between the first battery array 1 and the second battery array 2 is 1:3. In the hybrid power supply of this embodiment, a quantity of the first battery packs 11 to the second battery packs 22 is 2:3.

In this embodiment, the bidirectional converter 4 is a bidirectional transformer converter. The controller 3 controls the second battery array 2 to charge the first battery array 1 by the bidirectional converter 4 in one-way direction. That is, when the first battery array 1 is needed to be charged, the second battery array 2 is controlled by the controller 3 and used to charge the first battery array 1. However, the first battery array 1 is prohibited from being used to charge the second battery array 2.

Embodiment 4

As shown in FIG. 2, a hybrid power supply of the present embodiment includes a first battery array 1, a second battery array 2 and a controller 3. The first battery array 1 includes a plurality of first battery packs 11, and the second battery array 2 includes a plurality of second battery packs 22. These first battery packs 11 in the first battery array 1 are connected together in parallel, for example. Each of the first battery packs 11 includes a plurality of first battery cells 111. These first battery cells 111 in each first battery pack 11 are connected together in series, for example. These second battery packs 22 in the second battery array 2 are connected together in parallel, for example. Each of the second battery packs 22 includes a plurality of second battery cells 222. These second battery cells 222 in each second battery pack 22 are connected together in series, for example. The first battery array 1 and the second battery array 2 finally output power through a power bus 7. In the power bus 7, a switch module 8 is mounted thereon. The switch module 8 includes a plurality of switches 81 which can be switched on or off to control the output of the first battery array 1 and the second battery array 2. The controller 3 controls the first battery array 1 and the second battery array 2 for charging and discharging. The second battery array 2 is connected in parallel with the first battery array 1 by at least a bidirectional converter 4, for example, each second battery pack 22 is connected to the first battery array 1 via a bidirectional converter 4. Each second battery pack 22 together with the bidirectional converter 4 connected thereto is connected to the first battery array 1 in parallel. The first battery array 1 and the second battery array 2 are finally connected to the power bus 7 for outputting power of the hybrid power supply. The first battery array 1 has a rated voltage higher than the second battery array 2. The first battery array 1 has a high-rate charging/discharging performance higher than the second battery array 2, wherein a maximal continuous discharging rate of the first battery array 1 is 30 C, and a maximal continuous charging rate of the first battery array 1 is 4 C. The second battery array 2 has a capacity greater than the first battery array 1, wherein a ratio of the capacity between the first battery array 1 and the second battery array 2 is 1:8. In the hybrid power supply of this embodiment, a quantity of the first battery packs 11 to the second battery packs 22 is 1:4.

In this embodiment, the bidirectional converter 4 is a bidirectional transformer converter. The controller 3 controls the second battery array 2 to charge the first battery array 1 by the bidirectional converter 4 in one-way direction. That is, when the first battery array 1 is needed to be charged, the second battery array 2 is controlled by the controller 3 and used to charge the first battery array 1. However, the first battery array 1 is prohibited from being used to charge the second battery array 2.

Embodiment 5

As shown in FIG. 2, a hybrid power supply of the present embodiment includes a first battery array 1, a second battery array 2 and a controller 3. The first battery array 1 includes a plurality of first battery packs 11, and the second battery array 2 includes a plurality of second battery packs 22. These first battery packs 11 in the first battery array 1 are connected together in parallel, for example. Each of the first battery packs 11 includes a plurality of first battery cells 111. These first battery cells 111 in each first battery pack 11 are connected together in series, for example. These second battery packs 22 in the second battery array 2 are connected together in parallel, for example. Each of the second battery packs 22 includes a plurality of second battery cells 222. These second battery cells 222 in each second battery pack 22 are connected together in series, for example. The first battery array 1 and the second battery array 2 finally output power through a power bus 7. In the power bus 7, a switch module 8 is mounted thereon. The switch module 8 includes a plurality of switches 81 which can be switched on or off to control the output of the first battery array 1 and the second battery array 2. The controller 3 controls the first battery array 1 and the second battery array 2 for charging and discharging. The second battery array 2 is connected in parallel with the first battery array 1 by at least a bidirectional converter 4, for example, each second battery pack 22 is connected to the first battery array 1 via a bidirectional converter 4. Each second battery pack 22 together with the bidirectional converter 4 connected thereto is connected to the first battery array 1 in parallel. The first battery array 1 and the second battery array 2 are finally connected to the power bus 7 for outputting power of the hybrid power supply. The first battery array 1 has a rated voltage higher than the second battery array 2. The first battery array 1 has a high-rate charging/discharging performance higher than the second battery array 2, wherein a maximal continuous discharging rate of the first battery array 1 is 30 C, and a maximal continuous charging rate of the first battery array 1 is 4 C. The second battery array 2 has a capacity greater than the first battery array 1, wherein a ratio of the capacity between the first battery array 1 and the second battery array 2 is 1:10. In the hybrid power supply of this embodiment, a quantity of the first battery packs 11 to the second battery packs 22 is 1:5.

In this embodiment, the bidirectional converter 4 is a bidirectional transformer converter. The controller 3 controls the second battery array 2 to charge the first battery array 1 by the bidirectional converter 4 in one-way direction. That is, when the first battery array 1 is needed to be charged, the second battery array 2 is controlled by the controller 3 and used to charge the first battery array 1. However, the first battery array 1 is prohibited from being used to charge the second battery array 2.

Embodiment 6

As shown in FIG. 1a and FIG. 1b, a hybrid power supply of the present embodiment includes a first battery array 1 and a controller 3. The first battery array 1 includes a plurality of first battery packs 11. Each of the first battery packs 11 includes a plurality of first battery cells 111. Referring to FIG. 1a, as an example, these first battery packs 11 in the first battery array 1 are connected together in parallel, and these first battery cells 111 in each first battery pack 11 are connected together in series. Referring to FIG. 1b, as another example, these first battery packs 11 in the first battery array 1 are connected together in series, and these first battery cells 111 in each first battery pack 11 are connected together in parallel. The first battery array 1 finally outputs power through a power bus 7. In the power bus 7, a switch module 8 is mounted thereon. The switch module 8 includes a plurality of switches 81 which can be switched on or off to control the output of the first battery array 1. The controller 3 controls the first battery array 1 for charging and discharging. A maximal continuous discharging rate of the first battery array 1 is 30 C, and a maximal continuous charging rate of the first battery array 1 is 10 C.

Embodiment 7

As shown in FIG. 2, a hybrid power supply of the present embodiment includes a first battery array 1, a second battery array 2 and a controller 3. The first battery array 1 includes a plurality of first battery packs 11, and the second battery array 2 includes a plurality of second battery packs 22. These first battery packs 11 in the first battery array 1 are connected together in parallel, for example. Each of the first battery packs 11 includes a plurality of first battery cells 111. These first battery cells 111 in each first battery pack 11 are connected together in series, for example. These second battery packs 22 in the second battery array 2 are connected together in parallel, for example. Each of the second battery packs 22 includes a plurality of second battery cells 222. These second battery cells 222 in each second battery pack 22 are connected together in series, for example. The first battery array 1 and the second battery array 2 finally output power through a power bus 7. In the power bus 7, a switch module 8 is mounted thereon. The switch module 8 includes a plurality of switches 81 which can be switched on or off to control the output of the first battery array 1 and the second battery array 2. The controller 3 controls the first battery array 1 and the second battery array 2 for charging and discharging. The second battery array 2 is connected in parallel with the first battery array 1 by at least a bidirectional converter 4, for example, each second battery pack 22 is connected to the first battery array 1 via a bidirectional converter 4. Each second battery pack 22 together with the bidirectional converter 4 connected thereto is connected to the first battery array 1 in parallel. The first battery array 1 and the second battery array 2 are finally connected to the power bus 7 for outputting power of the hybrid power supply. The first battery array 1 has a rated voltage higher than the second battery array 2. The first battery array 1 has a high-rate charging/discharging performance higher than the second battery array 2, wherein a maximal continuous discharging rate of the first battery array 1 is 30 C, and a maximal continuous charging rate of the first battery array 1 is 10 C. The second battery array 2 has a capacity greater than the first battery array 1, wherein a ratio of the capacity between the first battery array 1 and the second battery array 2 is 1:2. In the hybrid power supply of this embodiment, a quantity of the first battery packs 11 to the second battery packs 22 is 1:1.

In this embodiment, the bidirectional converter 4 is a bidirectional transformer converter. The controller 3 controls the second battery array 2 to charge the first battery array 1 by the bidirectional converter 4 in one-way direction. That is, when the first battery array 1 is needed to be charged, the second battery array 2 is controlled by the controller 3 and used to charge the first battery array 1. However, the first battery array 1 is prohibited from being used to charge the second battery array 2.

Embodiment 8

As shown in FIG. 2, a hybrid power supply of the present embodiment includes a first battery array 1, a second battery array 2 and a controller 3. The first battery array 1 includes a plurality of first battery packs 11, and the second battery array 2 includes a plurality of second battery packs 22. These first battery packs 11 in the first battery array 1 are connected together in parallel, for example. Each of the first battery packs 11 includes a plurality of first battery cells 111. These first battery cells 111 in each first battery pack 11 are connected together in series, for example. These second battery packs 22 in the second battery array 2 are connected together in parallel, for example. Each of the second battery packs 22 includes a plurality of second battery cells 222. These second battery cells 222 in each second battery pack 22 are connected together in series, for example. The first battery array 1 and the second battery array 2 finally output power through a power bus 7. In the power bus 7, a switch module 8 is mounted thereon. The switch module 8 includes a plurality of switches 81 which can be switched on or off to control the output of the first battery array 1 and the second battery array 2. The controller 3 controls the first battery array 1 and the second battery array 2 for charging and discharging. The second battery array 2 is connected in parallel with the first battery array 1 by at least a bidirectional converter 4, for example, each second battery pack 22 is connected to the first battery array 1 via a bidirectional converter 4. Each second battery pack 22 together with the bidirectional converter 4 connected thereto is connected to the first battery array 1 in parallel. The first battery array 1 and the second battery array 2 are finally connected to the power bus 7 for outputting power of the hybrid power supply. The first battery array 1 has a rated voltage higher than the second battery array 2. The first battery array 1 has a high-rate charging/discharging performance higher than the second battery array 2, wherein a maximal continuous discharging rate of the first battery array 1 is 30 C, and a maximal continuous charging rate of the first battery array 1 is 10 C. The second battery array 2 has a capacity greater than the first battery array 1, wherein a ratio of the capacity between the first battery array 1 and the second battery array 2 is 1:3. In the hybrid power supply of this embodiment, a quantity of the first battery packs 11 to the second battery packs 22 is 2:3.

In this embodiment, the bidirectional converter 4 is a bidirectional transformer converter. The controller 3 controls the second battery array 2 to charge the first battery array 1 by the bidirectional converter 4 in one-way direction. That is, when the first battery array 1 is needed to be charged, the second battery array 2 is controlled by the controller 3 and used to charge the first battery array 1. However, the first battery array 1 is prohibited from being used to charge the second battery array 2.

Embodiment 9

As shown in FIG. 2, a hybrid power supply of the present embodiment includes a first battery array 1, a second battery array 2 and a controller 3. The first battery array 1 includes a plurality of first battery packs 11, and the second battery array 2 includes a plurality of second battery packs 22. These first battery packs 11 in the first battery array 1 are connected together in parallel, for example. Each of the first battery packs 11 includes a plurality of first battery cells 111. These first battery cells 111 in each first battery pack 11 are connected together in series, for example. These second battery packs 22 in the second battery array 2 are connected together in parallel, for example. Each of the second battery packs 22 includes a plurality of second battery cells 222. These second battery cells 222 in each second battery pack 22 are connected together in series, for example. The first battery array 1 and the second battery array 2 finally output power through a power bus 7. In the power bus 7, a switch module 8 is mounted thereon. The switch module 8 includes a plurality of switches 81 which can be switched on or off to control the output of the first battery array 1 and the second battery array 2. The controller 3 controls the first battery array 1 and the second battery array 2 for charging and discharging. The second battery array 2 is connected in parallel with the first battery array 1 by at least a bidirectional converter 4, for example, each second battery pack 22 is connected to the first battery array 1 via a bidirectional converter 4. Each second battery pack 22 together with the bidirectional converter 4 connected thereto is connected to the first battery array 1 in parallel. The first battery array 1 and the second battery array 2 are finally connected to the power bus 7 for outputting power of the hybrid power supply. The first battery array 1 has a rated voltage higher than the second battery array 2. The first battery array 1 has a high-rate charging/discharging performance higher than the second battery array 2, wherein a maximal continuous discharging rate of the first battery array 1 is 30 C, and a maximal continuous charging rate of the first battery array 1 is 10 C. The second battery array 2 has a capacity greater than the first battery array 1, wherein a ratio of the capacity between the first battery array 1 and the second battery array 2 is 1:8. In the hybrid power supply of this embodiment, a quantity of the first battery packs 11 to the second battery packs 22 is 1:4.

In this embodiment, the bidirectional converter 4 is a bidirectional transformer converter. The controller 3 controls the second battery array 2 to charge the first battery array 1 by the bidirectional converter 4 in one-way direction. That is, when the first battery array 1 is needed to be charged, the second battery array 2 is controlled by the controller 3 and used to charge the first battery array 1. However, the first battery array 1 is prohibited from being used to charge the second battery array 2.

Embodiment 10

As shown in FIG. 2, a hybrid power supply of the present embodiment includes a first battery array 1, a second battery array 2 and a controller 3. The first battery array 1 includes a plurality of first battery packs 11, and the second battery array 2 includes a plurality of second battery packs 22. These first battery packs 11 in the first battery array 1 are connected together in parallel, for example. Each of the first battery packs 11 includes a plurality of first battery cells 111. These first battery cells 111 in each first battery pack 11 are connected together in series, for example. These second battery packs 22 in the second battery array 2 are connected together in parallel, for example. Each of the second battery packs 22 includes a plurality of second battery cells 222. These second battery cells 222 in each second battery pack 22 are connected together in series, for example. The first battery array 1 and the second battery array 2 finally output power through a power bus 7. In the power bus 7, a switch module 8 is mounted thereon. The switch module 8 includes a plurality of switches 81 which can be switched on or off to control the output of the first battery array 1 and the second battery array 2. The controller 3 controls the first battery array 1 and the second battery array 2 for charging and discharging. The second battery array 2 is connected in parallel with the first battery array 1 by at least a bidirectional converter 4, for example, each second battery pack 22 is connected to the first battery array 1 via a bidirectional converter 4. Each second battery pack 22 together with the bidirectional converter 4 connected thereto is connected to the first battery array 1 in parallel. The first battery array 1 and the second battery array 2 are finally connected to the power bus 7 for outputting power of the hybrid power supply. The first battery array 1 has a rated voltage higher than the second battery array 2. The first battery array 1 has a high-rate charging/discharging performance higher than the second battery array 2, wherein a maximal continuous discharging rate of the first battery array 1 is 30 C, and a maximal continuous charging rate of the first battery array 1 is 10 C. The second battery array 2 has a capacity greater than the first battery array 1, wherein a ratio of the capacity between the first battery array 1 and the second battery array 2 is 1:10. In the hybrid power supply of this embodiment, a quantity of the first battery packs 11 to the second battery packs 22 is 1:5.

In this embodiment, the bidirectional converter 4 is a bidirectional transformer converter. The controller 3 controls the second battery array 2 to charge the first battery array 1 by the bidirectional converter 4 in one-way direction. That is, when the first battery array 1 is needed to be charged, the second battery array 2 is controlled by the controller 3 and used to charge the first battery array 1. However, the first battery array 1 is prohibited from being used to charge the second battery array 2.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A hybrid power supply, comprising:
   a first battery array comprising a plurality of first battery packs;
   a second battery array comprising a plurality of second battery packs; and
   a controller controlling charging and discharging of the first battery array and the second battery array;
   wherein the second battery array is connected in parallel with the first battery array by at least a bidirectional converter, the first battery array and the second battery array are connected to a same power bus for outputting power simultaneously via the same power bus; and
   wherein the first battery array has a high-rate charging/discharging performance higher than the second battery array, a maximal continuous discharging rate of the first battery array is in the range from 15 C to 35 C, and a maximal continuous charging rate of the first battery array is in the range from 4 C to 30 C.

2. The hybrid power supply according to claim 1, wherein the second battery array has a capacity greater than the first battery array, a ratio of the capacity between the first battery array and the second battery array is in the range from 1:2 to 1:10.

3. The hybrid power supply according to claim 2, wherein the ratio of the capacity between the first battery array and the second battery array is in the range from 1:2 to 1:8.

4. The hybrid power supply according to claim 3, wherein the ratio of the capacity between the first battery array and the second battery array is 1:8.

5. The hybrid power supply according to claim 1, wherein the maximal continuous discharging rate of the first battery array is in the range from 20 C to 35 C.

6. The hybrid power supply according to claim 5, wherein the maximal continuous discharging rate of the first battery array is 30 C.

7. The hybrid power supply according to claim 1, wherein the maximal continuous charging rate of the first battery array is in the range from 4 C to 20 C.

8. The hybrid power supply according to claim 1, wherein the second battery array is controlled to charge the first battery array in one-way direction.

9. The hybrid power supply according to claim 1, wherein the controller controls the second battery array to charge the first battery array by the bidirectional converter in one-way direction.

10. The hybrid power supply according to claim 1, wherein the bidirectional converter is a bidirectional transformer converter.

11. The hybrid power supply according to claim 1, wherein each second battery pack is connected to the first battery array via a bidirectional converter.

12. The hybrid power supply according to claim 2, wherein the maximal continuous discharging rate of the first battery array is 30 C, the maximal continuous charging rate of the first battery array is 4 C, and the ratio of the capacity between the first battery array and the second battery array is 1:2.

13. The hybrid power supply according to claim 2, wherein the maximal continuous discharging rate of the first battery array is 30 C, the maximal continuous charging rate of the first battery array is 4 C, and the ratio of the capacity between the first battery array and the second battery array is 1:3.

14. The hybrid power supply according to claim 2, wherein the maximal continuous discharging rate of the first battery array is 30 C, the maximal continuous charging rate of the first battery array is 4 C, and the ratio of the capacity between the first battery array and the second battery array is 1:8.

15. The hybrid power supply according to claim 2, wherein the maximal continuous discharging rate of the first battery array is 30 C, the maximal continuous charging rate of the first battery array is 4 C, and the ratio of the capacity between the first battery array and the second battery array is 1:10.

16. The hybrid power supply according to claim 2, wherein the maximal continuous discharging rate of the first battery array is 30 C, the maximal continuous charging rate of the first battery array is 10 C, and the ratio of the capacity between the first battery rate and the second battery array is 1:2.

17. The hybrid power supply according to claim 2, wherein the maximal continuous discharging rate of the first battery array is 30 C, the maximal continuous charging rate of the first battery array is 10 C, and the ratio of the capacity between the first battery array and the second battery array is 1:3.

18. The hybrid power supply according to claim 2, wherein the maximal continuous discharging rate of the first battery array is 30 C, the maximal continuous charging rate of the first battery array is 10 C, and the ratio of the capacity between the first battery array and the second battery array is 1:8.

19. The hybrid power supply according to claim 2, wherein the maximal continuous discharging rate of the first battery array is 30 C, the maximal continuous charging rate of the first battery array is 10 C, and the ratio of the capacity between the first battery array and the second battery array is 1:10.

20. An electric vehicle using the hybrid power supply according to claim 1.

* * * * *